Dec. 15, 1925.
F. GEAUDREAU
1,566,085
RUNNER ATTACHMENT FOR AUTOMOBILES
Filed March 17, 1924  2 Sheets-Sheet 1
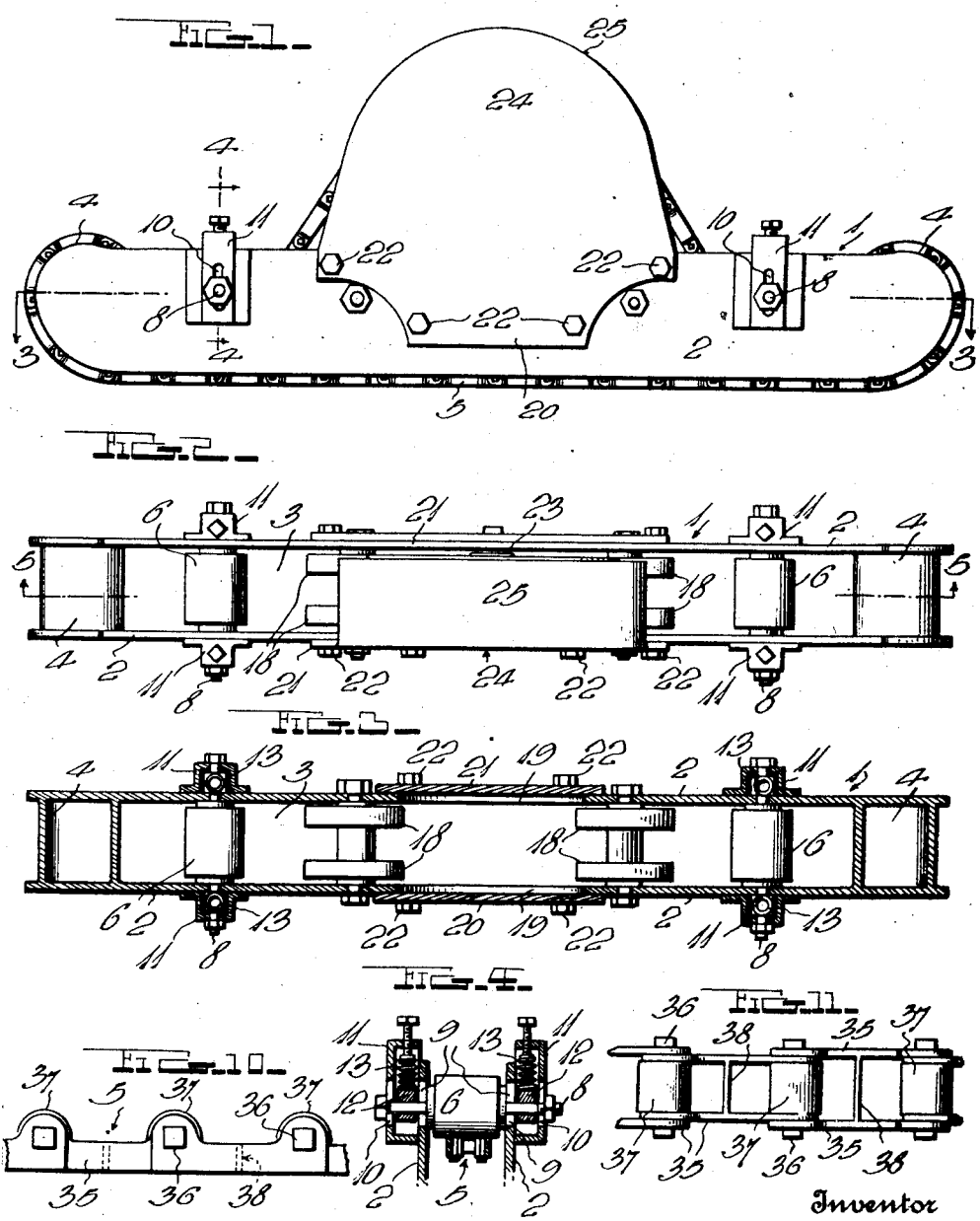
Witness
H. Woodard
Inventor
F. Geaudreau
By H. B. Willson & Co.
Attorneys Dec. 15, 1925.
F. GEAUDREAU
1,566,085
RUNNER ATTACHMENT FOR AUTOMOBILES
Filed March 17, 1924 2 Sheets-Sheet 2
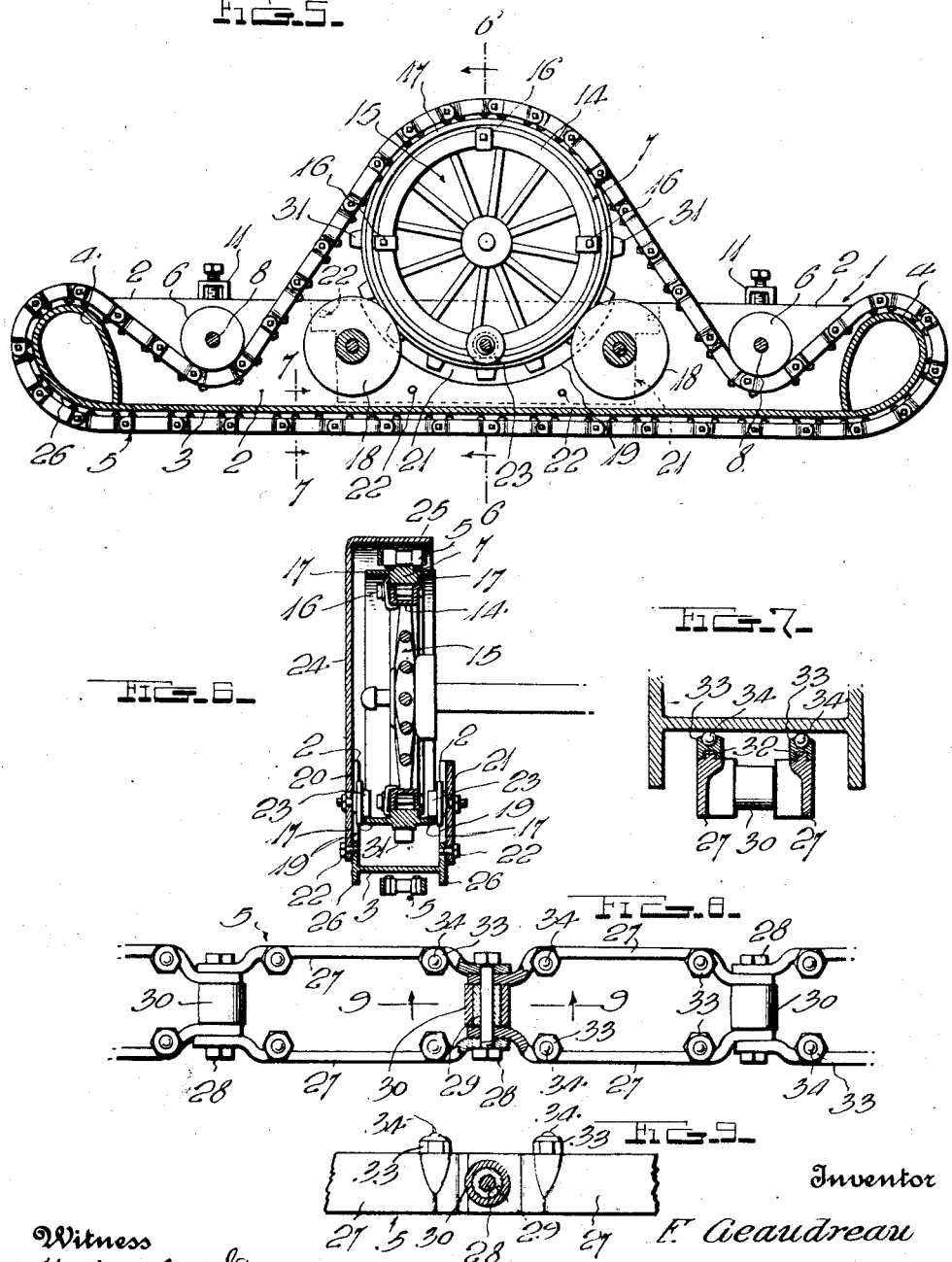
Inventor
F. Geaudreau
Witness
H. Woodard
By H. B. Wilson & Co.
Attorneys Patented Dec. 15, 1925.

1,566,085

UNITED STATES PATENT OFFICE.

FRANK GEAUDREAU, OF NEWPORT, WASHINGTON, ASSIGNOR TO GEAUDREAU AND THOMPSON, A FIRM OR PARTNERSHIP COMPOSED OF FRANK GEAUDREAU AND CHARLES CARROL THOMPSON, OF NEWPORT, WASHINGTON.

RUNNER ATTACHMENT FOR AUTOMOBILES.

Application filed March 17, 1924. Serial No. 699,931.

*To all whom it may concern:*

Be it known that I, FRANK GEAUDREAU, a citizen of the United States, residing at Newport, in the county of Pend Oreille and State of Washington, have invented certain new and useful Improvements in Runner Attachments for Automobiles; and I do declare the following to be a full, clear, and exact description of the invention, such as will enable others skilled in the art to which it appertains to make and use the same.

My invention relates to runners adapted for connection with automobiles for use whenever advisable, and the principal object is to provide unique attaching means for the runners, consisting of rims applicable to the fellies of the automobile wheels, in place of the usual demountable rims and tires. Thus, it is an extremely easy matter to equip an automobile with the runners, or to remove them, when the tires can again be advantageously used.

A further object is to provide a construction in which the rims applied to the rear wheels of an automobile, act as drivers for propelling the machine.

Yet another aim is to provide a simple and inexpensive, yet an efficient and durable runner construction.

With the foregoing in view, the invention resides in the novel subject matter hereinafter described and claimed, the description being supplemented by the accompanying drawings.

Figure 1 is an outer side elevation of a runner attachment constructed in accordance with my invention.

Figure 2 is a top plan view with the tread belt removed.

Figure 3 is a horizontal sectional view substantially on line 3—3 of Fig. 1, the wheel-engaging rim and the tread belt being omitted.

Figure 4 is a detail transverse section as indicated by line 4—4 of Fig. 1.

Figure 5 is a longitudinal sectional view on line 5—5 of Fig. 2.

Figure 6 is a vertical transverse section as indicated by line 6—6 of Fig. 5.

Figure 7 is a detail sectional view on the plane of line 7—7 of Fig. 5.

Figure 8 is a plan view partly in section, showing one form of tread chain which may be used.

Figure 9 is a detail sectional view on line 9—9 of Fig. 8.

Figure 10 is a fragmentary side elevation illustrating a different form of tread chain.

Figure 11 is a plan view of a portion of the tread chain shown in Fig. 10.

In the accompanying drawings, I have illustrated one form of the invention and in the following, this form has been specifically described, but it is to be understood at the outset that the invention is not restricted to the specific showing and description, except as restricted by the appended claims.

The numeral 1 designates a runner, in a general way, said runner being preferably of channel form with parallel side flanges 2 rising from a bottom 3, the ends of this bottom being turned upwardly, inwardly and downwardly and secured between the flanges 2, to provide rounded noses 4. An endless tread belt, preferably in the form of a chain 5, extends along the lower side of the bottom 3, passes around the noses 4, extends under appropriate tightening rollers 6, and passes over an annular rim 7 which is adapted to be applied to the felly of an automobile wheel in place of the usual demountable rim and tire.

The rollers 6 may be mounted in any desired manner, but I have shown them upon shafts 8 passing through slots 9 in the flanges 2 and through other slots 10 formed in spring and bearing housings 11 secured to said flanges. Within these housings, bearings 12 have been shown for the shafts 8, and adjustable springs 13 have been illustrated to normally exert any desired downward force on the bearings, thus constantly depressing the rollers 6 to take up all slack in the chain 5.

The rim 7 is adapted to be held upon the felly 14 of an automobile wheel 15, by the usual means 16, employed for securing an ordinary demountable rim upon said felly, and said rim 7 is preferably provided with laterally extending annular flanges 17 which rest on rollers 18 mounted between the flanges 2 of the runner 1. Between these rollers, the flanges 2 are preferably notched as indicated at 19 to facilitate attachment and removal of the device, and these notches are normally closed by side plates 20 and 21 which may be held in place by any suitable means, such as the cap-screws 22. The plates 20 and 21 carry flanged rollers 23 which engage the inner peripheries of the flanges 17, as well as the outer edges of these flanges, so that the rim 7 is rotatably connected in an advantageous manner with the runner 1, and is held in fixed relation with respect to said runner. The outermost plate 20 by preference carries a wheel guard 24 which may well have an inwardly extending fender portion 25 to extend over the rim 17 and a portion of the chain 5, passing over said rim.

By providing the construction shown and described, or a substantial equivalent thereof, it will be seen that the runner attachment may be quickly and easily applied to or removed from an automobile wheel, and that no changes whatever are necessary in the common automobile construction.

The chain 5 may be of any desired form but in all instances, the bottom 3 of the runner 1 is preferably provided with downwardly extending flanges 26 between which said chain runs. In Figs. 7, 8 and 9, one form of chain has been shown, said chain comprising parallel links 27 having overlapped ends through which bolts 28 pass, inner and outer rollers 29 and 30 being mounted on the bolts between the ends of the links, so as to anti-frictionally engage sprocket teeth 31 on the rim 7. Preferably, the links 27 are provided with threaded bosses 32 (Fig. 7) upon which ball-retainers 33 are threaded, said retainers being provided with ball-bearings 34 which are adapted to engage the runner bottom 3, in an anti-frictional manner. Whenever any of the balls 34 become damaged, the retainers 33 may be removed and new retainers, equipped with other balls, substituted.

The form of chain above described is preferably used on light passenger machines. For trucks, I prefer to use a chain of the construction shown in Figs. 10 and 11, in which the spaced pivotally connected links 35 are connected by bolts 36 upon which bearing rollers 37 are disposed, these rollers being positioned to engage the runner bottom 3. The links at opposite sides of the chain may well be connected at intervals by transverse webs 38, to cause the chain to effectively grip snow and ice and produce good traction.

Obviously, the idea of connecting runners with automobile wheels by means of a rim to take the place of the usual demountable rim and tire, may be used in connection with both front and rear wheels, if desired, and it is of course not essential that the rims for the front runners, be rotatably connected therewith. Rotatable connections of the rear rims with their respective runners, however, are essential, in order that said rims may act as drivers for the machine. Preferably, these rims drive an endless tread belt, as shown, but it is obvious that other provision might well be made whereby the rotation of the rims can be utilized to produce a propelling force.

I claim:

1. An attachment for an automobile wheel comprising a frame having a runner and an annular rim adapted to fit upon the felly of an automobile wheel after the tire-carrying rim has been removed and in place of the same, said frame being open adjacent one side of said rim to permit the attachment to be applied to the wheel while the latter is upon an automobile.

2. An attachment for an automobile, comprising a runner, and an annular rim forming the sole carrying means for said runner, said runner being applicable to the felly of an automobile wheel in place of the usual tire-carrying demountable rim.

3. An attachment for an automobile, comprising a runner, and an annular rim carrying said runner and having a rotatable connection with the latter, said rim being applicable to the felly of an automobile wheel in place of the usual tire-carrying demountable rim and constituting the sole carrying means for the runner, said rim acting as a driver.

4. An attachment for an automobile, comprising a runner, a laterally flanged rim applicable to an automobile wheel felly in place of the usual demountable rim, said rim being disposed over said runner, and rollers mounted on said runner and co-operating with the lateral flanges of said rim to rotatably mount the latter and hold said rim and runner in fixed relation.

5. An attachment for an automobile, comprising a runner having upstanding longitudinal side flanges, laterally spaced rollers mounted between said flanges, a rim rotatably engaging said rollers and adapted for application to an automobile wheel felly in place of the usual demountable rim, and a tread belt trained around said runner and engaged with said rim to be driven by the latter.

6. A structure as specified in claim 5; said side flanges being notched to clear the automobile wheel when applying and removing the attachment, detachable plates for closing the notches of said flanges, and additional rim-engaging rollers carried by said plates.

7. A structure as specified in claim 6; said side flanges being notched to clear the automobile wheel when applying and removing the attachment, detachable plates for closing the notches of said flanges, and a wheel guard carried by the outermost of said plates.

In testimony whereof I have hereunto affixed my signature.

FRANK GEAUDREAU.